Figure 1:
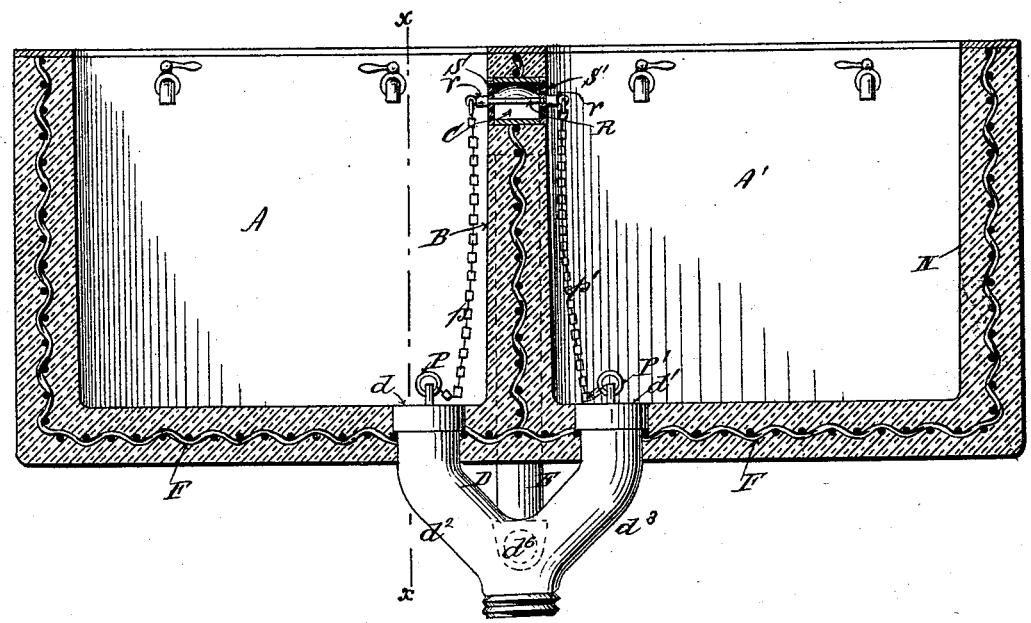

(No Model.) 2 Sheets—Sheet 1.

A. THOUROT.
WASTE AND OVERFLOW CONNECTION FOR STATIONARY WASH TUBS.

No. 455,072. Patented June 30, 1891.

Witnesses:
R. W. Gardner
G. J. Miatt

Inventor:
Alphonse Thourot
By his attorney
George William Miatt

THE NORRIS PETERS CO., PHOTO-LITHO., WASHINGTON, D. C.

(No Model.) 2 Sheets—Sheet 2.
A. THOUROT.
WASTE AND OVERFLOW CONNECTION FOR STATIONARY WASH TUBS.
No. 455,072. Patented June 30, 1891.
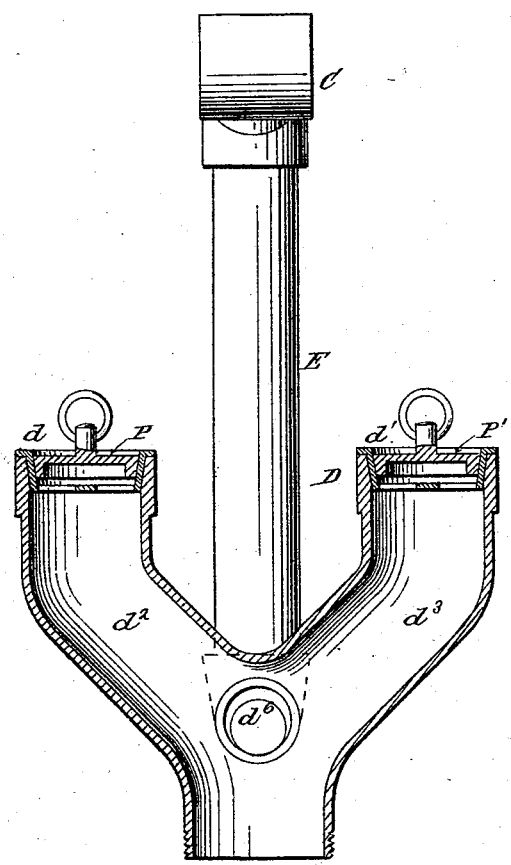
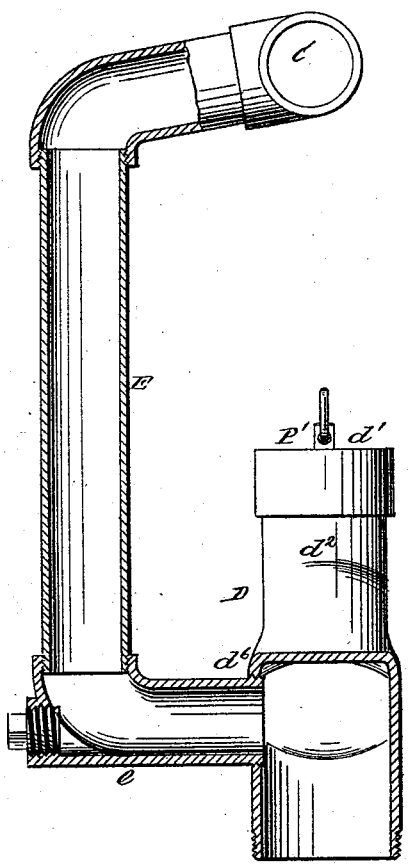
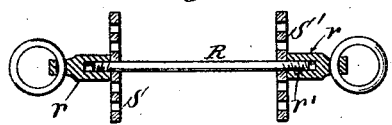
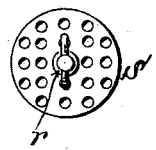
Witnesses:
D. W. Gardner
G. T. Miatt
Inventor:
Alphonse Thourot
By his attorney
George William Miatt
THE NORRIS PETERS CO., PHOTO-LITHO., WASHINGTON, D. C.

UNITED STATES PATENT OFFICE.

ALPHONSE THOUROT, OF UNION, HUDSON COUNTY, NEW JERSEY.

WASTE AND OVERFLOW CONNECTION FOR STATIONARY WASH-TUBS.

SPECIFICATION forming part of Letters Patent No. 455,072, dated June 30, 1891.

Application filed May 7, 1891. Serial No. 391,879. (No model.)

*To all whom it may concern:*

Be it known that I, ALPHONSE THOUROT, a citizen of the United States, residing at Union township, in the county of Hudson and State of New Jersey, have invented certain new and useful Improvements in Waste and Overflow Connections for Stationary Wash-Tubs, of which the following is a description sufficient to enable others skilled in the art to which the invention appertains to make and use the same.

My improvements relate more especially to stationary wash-tubs made of cement or concrete with partition-walls. In this class of tubs the metal waste and overflow connections embedded in the cement frequently occasion the rupture of the tubs, owing to the strain to which they subject certain parts of the structure, which frequently has to sustain the weight of the whole waste-pipe system.

The object of the first feature of my invention is to so combine and form the waste and overflow connections that they together constitute a metallic brace or tie which re-enforces and protects the tubs against rupture or injury. Thus instead of being a source of weakness and danger to the tubs, as in the past, I render the overflow and waste connections instrumental in the production of a much stronger and superior article of manufacture as a whole than has heretofore been attained, the connections being actually incorporated with the structure of the tubs and constituting the backbone thereof.

The first feature of my invention consists in forming the overflow and waste connections into a rigid exterior brace, the ends of which are embedded in the bottom and rear walls of the cement tubs, substantially as hereinafter set forth.

I am aware that overflow-pipes and waste-pipes have heretofore been embedded independently in wash-tubs formed of cement, as in Patent No. 384,814, dated June 19, 1888, to Wesely, and I do not seek to cover the idea broadly. In fact my improved construction is designed to overcome and remedy the practical defects attendant upon the actual use of the construction and arrangement shown in the said patent, resulting, for instance, in the frequent cracking and breaking of the concrete walls, owing to excessive strain or inequality of strain upon the waste-head, which, it will be seen, is embedded bodily within the floor at the junction thereof with the partition-wall, thus weakening and subjecting to undue strain the very part of all others of cement tubs that ought to be strengthened and protected. This weakening of the tub referred to, which is the only one of the kind, so far as I know, in which the liquid-discharge passages are embedded directly in the cement, is still further contributed to by the formation of the overflow-passage directly within the partition. The operation of forming the overflow-passage within the partition-wall is also difficult, expensive, and unreliable, since the passage is liable to be contracted or clogged with concrete, the inner surface of which, not being finished like the exterior, readily absorbs moisture and filth, rendering the contrivance unsafe and unhealthy.

Another serious practical objection to the construction shown in the Wesely patent, as I have frequently found from actual experience with such tubs under various conditions in dwellings, &c., is that if there is any considerable difference in level between the liquid in two adjoining tubs, or if one be empty and the waste-plug in the tub in which there is a preponderance of pressure is withdrawn, the escaping liquid will drive up the waste-plug in the other tub and enter the latter, owing to the fact that the waste-head is simply a chamber into which the liquid is discharged on the same level, so that the shape of the waste-head or the resistance in the waste-pipe itself shunts the liquid from one tub to the other. I overcome this difficulty in my construction by, and one feature of my invention consists in, forming a distinct conduit for each waste-sink, the conduits intersecting each other so far below the waste-openings and at such an angle with relation to each other and to the waste-pipe itself that all possibility of backflow or the washing out of plugs and commingling of contents is positively prevented.

While the leading features of my improvements are not necessarily related to concrete tubs re-enforced by metallic frame-work, as set forth in Patent No. 413,861, dated October 29, 1889, there are certain special advantages in using this construction of tub in connection therewith, and my invention includes the combination and arrangement, with the metallic frame-work embedded in the cement, of the waste-pipes connected with the metal frame in such manner that the weight and strain of the pipes are imparted to and distributed by the metallic frame-work over the structure, thus relieving the cement from undue or dangerous strain and greatly augmenting the strength and stability of the structure as a whole. I also thus practically obviate all trouble or danger from the pulling out or loosening of the ends of the pipes embedded in the cement—a difficulty heretofore frequently encountered.

It will be seen that by my construction and arrangement of the overflow I am enabled to carry the metallic frame through the body of the partition and to fasten the overflow-head thereto, thereby re-enforcing the part of the structure which is subjected to the greatest strain, a construction that would be impossible in the Wesely device referred to, in which the overflow is a hollow extending the greater portion of the height of the partition.

Figure 2:
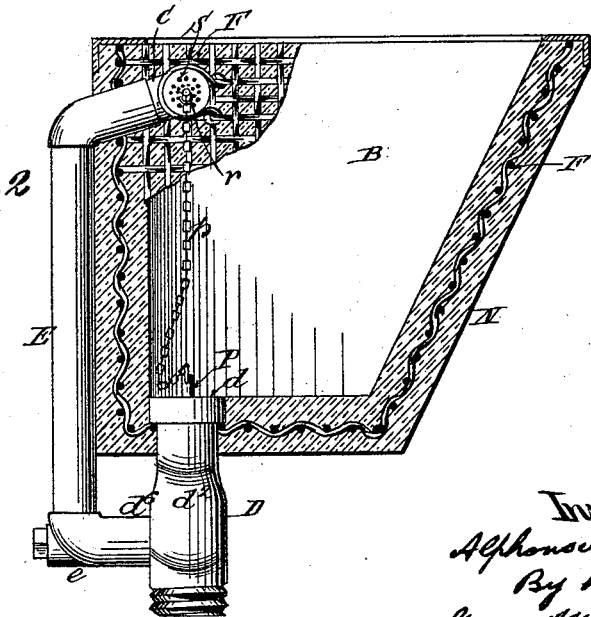

In the accompanying drawings, Figure 1 is a vertical longitudinal section through two tubs constructed according to my invention; Fig. 2, a transverse vertical section upon plane of line $x$ $x$, Fig. 1, showing the overflow and waste connections in elevation and a portion of the partition broken away to expose the metallic frame, &c. Fig. 3 is a vertical section, upon a larger scale, of the waste-head, the overflow being shown in elevation. Fig. 4 is a central vertical section at right angles to Fig. 3. Fig. 5 is a longitudinal section of the strainer-bolt, strainers, &c.; Fig. 6, an end view of structure shown in Fig. 5.

The duplex tub A A' is formed of concrete or plastic material, as hydraulic cement mixed with freshly-crushed granite or any other suitable material or combination thereof in substantially the same manner heretofore practiced in the manufacture of earthenware tubs, a wire frame-work F being preferably incorporated in the structure, after the manner provided for in Letters Patent No. 413,861, hereinbefore referred to.

Prior to the building up of the tubs the Y waste-head D, T-headed overflow C, and connecting exterior overflow-pipe E are assembled together by suitable means to form a single rigid structure. Thus formed into a single integral piece, the waste and overflow connections as a whole are placed in position upon and within and are preferably positively attached to the metallic frame F before the cement, &c., is applied to the frame. The said connections and the frame F having thus been properly adjusted with relation to each other, the walls of cement N are built up around the T-head C and the upper ends of the branches $d^2$ $d^3$ of the Y-head D, thus combining and sealing the whole into one inseparable rigid structure of greater strength and durability than has heretofore been attained in the art. It will be seen that the overflow C, pipe E, and Y-head D constitute a rigid brace and support for the center and rear of the duplex tub, virtually binding the top and bottom together. Any strain caused by the waste-pipe connection with the head D is thus distributed to the tub in such manner as to prevent all possibility of the pulling out of the waste-arms $d^2$ $d^3$, since the pipe E and embedded T-head C act as a substantial anchorage and support for the waste-head D. This is especially so when the overflow C and the ends of the arms $d^2$ $d^3$ of the waste-head D are connected directly with the metallic frame F, in which case the strain is virtually distributed throughout the whole of the structure, practically relieving the cement from all possibility of fracture or distortion. The upper ends $d^4$ $d^5$ of the bifurcated arms $d^2$ $d^3$ of the head D are preferably vertical for a distance equal to the thickness of the bottom of the tubs in which they are embedded, from which points the arms $d^2$ $d^3$ converge together at such an angle that their point of juncture is some distance below the bottom of the tubs. As a consequence the waste water is conducted directly and positively into the main waste-pipe without any possible contact or interference with the waste plug or opening in the other tub, and all commingling or transfer of liquid from one tub to the other is avoided. The lateral arm $e$ of the exterior overflow E also enters the head D at the juncture $d^6$, thus practically constituting a four-way joint at this point and insuring the entrance of the overflow water directly into the main waste-pipe.

The strainers S S' consist of perforated disks applied to the opposite sides of the T-head C and bound thereto by the screw-rod R and nut $r$. By the use of a nut having a female screw-thread of sufficient depth any variation in the width of the head C or partition-wall may be compensated for without altering the appearance of the device.

I attach the anchor-chains $p$ $p'$ of the plugs P P', respectively, to the head $r'$ of the bolt R and to the nut $r$, thereby making the means of securing the strainers in position perform a double function and simplifying and improving the arrangement of parts as a whole.

What I claim as my invention, and desire to secure by Letters Patent, is—

1. The combination of the cement or concrete tubs A A', formed with a common partition B, a T-headed overflow-pipe C, embedded in said partition and opening upon either side thereof and extending laterally through the rear wall of the tubs, a Y-pipe head D, having its upper ends embedded in the floor of the structure on opposite sides of the partition B to form the waste-sinks $d$ $d'$, and the exterior overflow-pipe E, connecting with and binding the embedded overflow-pipe C and the Y-pipe rigidly together, substantially in the manner and for the purpose described.

2. The combination of the cement or concrete tubs A A', formed with a common partition B, the metallic frame-work F, embedded in the cement, a T-headed overflow-pipe C, embedded in said partition B and metal frame-work F and opening upon either side of the partition and extending laterally through the rear wall of the tubs, a Y-pipe head D, having its upper ends embedded in the metal frame F and the floor of the structure on opposite sides of the partition B to form the waste-sinks $d$ $d'$, and the exterior overflow-pipe E, connected with and binding the imbedded overflow-pipe C and the Y waste-pipe D rigidly together, substantially in the manner and for the purpose described.

3. The combination of the concrete or cement tubs A A', formed with the partition B, a T-headed overflow-pipe C, embedded in said partition and opening upon either side thereof and extending laterally through the rear wall of the tubs, a Y-pipe head D, having its upper ends embedded in the floor of the structure on opposite sides of the partition B to form the waste-sinks $d$ $d'$ and having its branches $d^2$ $d^3$ intersecting each other at an angle below the bottom of the tubs, and the exterior overflow-pipe E, connecting the embedded overflow-pipe C with the said Y-pipe D at the intersection of the branches $d^2$ $d^3$, substantially in the manner and for the purpose described.

ALPHONSE THOUROT.

Witnesses:
LOUIS A. MENEGAUX,
GEO. W. SCHAEFER.